United States Patent [19]
Takano et al.

[11] Patent Number: 5,705,864
[45] Date of Patent: Jan. 6, 1998

[54] STEPPING MOTOR

[75] Inventors: Hironori Takano; Tatsuo Chigira, both of Yokohama, Japan

[73] Assignee: Canon Kabushiki Kaisha, Tokyo, Japan

[21] Appl. No.: 279,117

[22] Filed: Jul. 22, 1994

[30] Foreign Application Priority Data

| Jul. 29, 1993 | [JP] | Japan | 5-207313 |
| Jul. 29, 1993 | [JP] | Japan | 5-207315 |
| Nov. 30, 1993 | [JP] | Japan | 5-326043 |

[51] Int. Cl.$^6$ .................................................. H02K 37/00
[52] U.S. Cl. .......................... 310/49 R; 310/42; 310/89
[58] Field of Search ........................... 310/42, 49 R, 310/49 A, 89, 216, 217, 218, 254, 90

[56] References Cited

U.S. PATENT DOCUMENTS

| 5,166,565 | 11/1992 | Katsuzawa et al. | 310/90 |
| 5,363,003 | 11/1994 | Harada et al. | 310/67 R |
| 5,376,850 | 12/1994 | Elsing et al. | 310/67 R |
| 5,394,039 | 2/1995 | Suchdeu et al. | 310/51 |

FOREIGN PATENT DOCUMENTS

| 0060915 | 5/1977 | Japan | 310/218 |

Primary Examiner—Steven L. Stephen
Assistant Examiner—Judson H. Jones
Attorney, Agent, or Firm—Fitzpatrick, Cella, Harper & Scinto

[57] ABSTRACT

A stepping motor having a rotor includes a permanent magnet and a plurality of stators and coils provided around the permanent magnet. The motor also includes a resiliently deformable portion integrally provided with a stator case for biasing the stators toward an output shaft of the motor, whereby the stators are made reliable fixable in the stator case and when the rotor is to be mounted in the stator case, and a lead screw of the output shaft is prevented from being injured.

12 Claims, 6 Drawing Sheets

STEPPING MOTOR

BACKGROUND OF THE INVENTION

1. Field of the Invention

This invention relates to a stepping motor suitable for driving the photo-taking lens of a single-lens reflex camera, a video camera or the like.

2. Related Background Art

Figure 9:
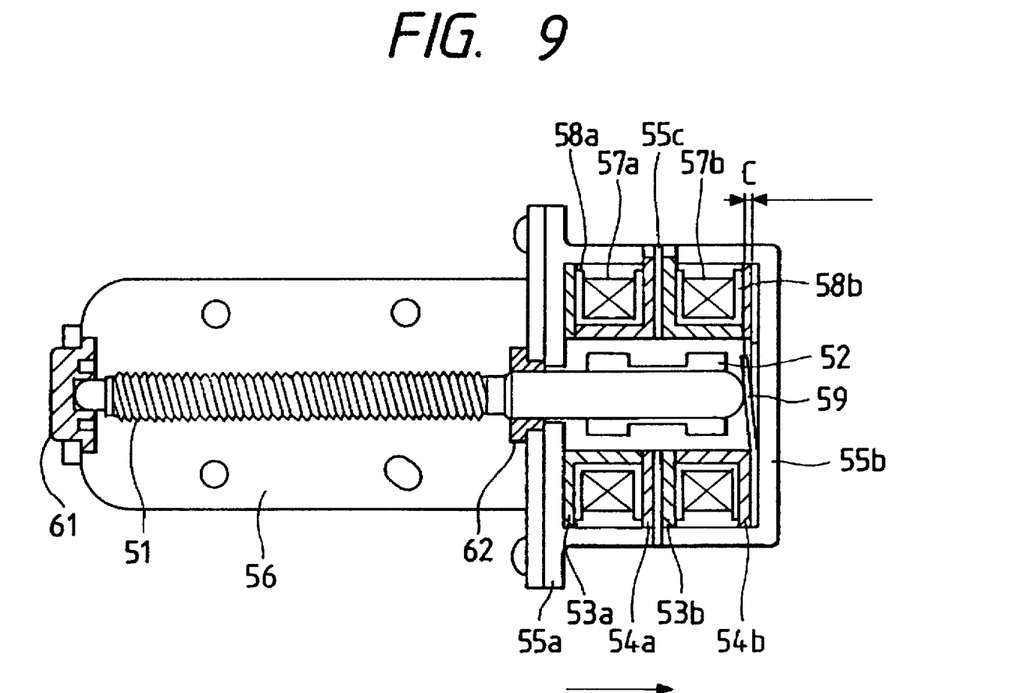
FIG. 9 is a cross-sectional view showing a stepping motor according to the prior art.
Figure 10:
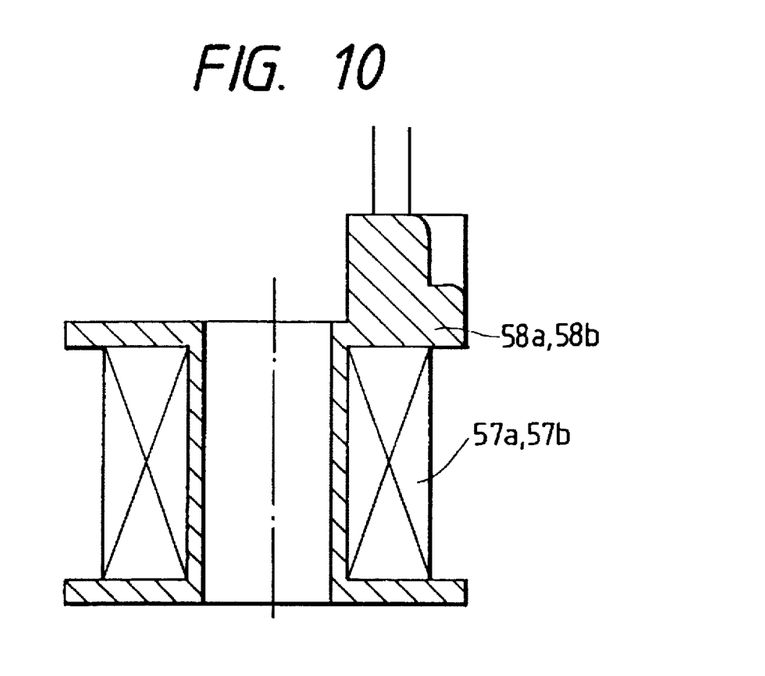
FIG. 10 is a cross-sectional view of the bobbin of the prior-art stepping motor shown in FIG. 9.

A stepping motor as shown in FIG. 9 of the accompanying drawings has heretofore been used as a stepping motor for driving the photo-taking lens of a single-lens reflex camera, a video camera or the like. In FIG. 9, the reference numeral 52 designates a cylindrical type magnet, the outer peripheral surface of which is multipole-magnetized. A lead screw is fixed to the cylindrical type magnet 52 by an adhesive agent or the like to thereby constitute an output shaft 51. The reference characters 53a, 53b and 54a, 54b denote stators disposed so as to surround the outer peripheral portion of the cylindrical type magnet 52, and the reference characters 57a and 57b designate coils wound on ring-like bobbins 58a and 58b, respectively, as shown in FIG. 10 of the accompanying drawings for producing magnetic poles on the stators 53a, 53b and 54a, 54b. The reference characters 55a and 55b denote stator cases formed integrally with the stators and made of a metal forming magnetic paths, the reference numeral 56 designates a support member having two bearings 61 and 62 for supporting the output shaft, and the reference numeral 59 denotes a biasing spring for axially biasing the output shaft 51 and effecting the removal of back-lash. The reference character 55c designates a plate formed of a non-magnetic material provided so as not to cause the respective magnetic paths from interfering with one another.

The stepping motor shown in FIG. 9 is a PM type stepping motor of the two-phase type, in which the bearing side phase is A phase (the constituents of which are given a suffix a) and the biasing spring side is B phase (the constituents of which are given a suffix b). For example, A phase comprises an upper stator 53a, a lower stator 54a, a coil 57a, a bobbin 58a having the coil 57a wound thereon, and a stator case 55a.

The upper and lower stators 53a and 54a each have a plurality of comb-teeth, and are disposed in such a manner that the respective comb-teeth mesh with one another with the coil 57a interposed therebetween. The B phase also comprises the same parts, which are likewise disposed.

The positions of the A phase and the B phase are disposed so that their comb-teeth may form a predetermined phase, and for that purpose, the stator cases 55a and 55b each have a positioning cut-away portion, not shown, and projected portions provided on the lower stator 54a and upper stator 53b fit to the respective cut-away portions to thereby bring about a predetermined phase relation. Further, a plate made of a non-magnetic material is interposed between the stator cases 55a and 55b so that the magnetic paths of respective phases may not affect each other.

In the stepping motor constructed as described above, the stators are fixed to the stator cases as by spot welding in order to stabilize the motor and the characteristics thereof, and improve the quality thereof. However, such a fixing method makes the motor very expensive.

Also, in the prior-art stepping motor, when a force (impact force) in the direction of the output shaft acts on the motor, for example, when an apparatus on which this motor is mounted falls, the output shaft 51 tries to move in the direction of the arrow indicated in FIG. 9 against the biasing force of the biasing spring 59. In preparation for such an occasion, the amount of movement of the output shaft 51 is regulated by a mechanical end provided within the motor.

Figure 6:
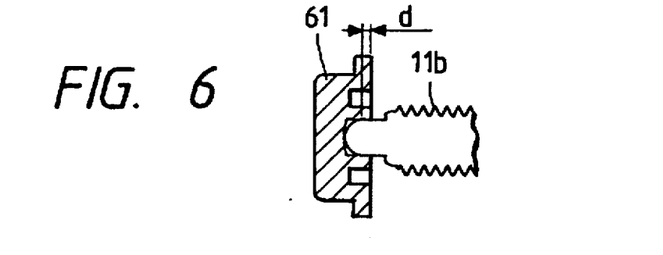
FIG. 6 is a cross-sectional view showing the fore side bearing of the stepping motor shown in FIG. 1 and a part associated therewith.

That is, the clearance c between the rearmost end portion (the biasing spring side) of the lead screw 51 and the lead screw side end surface of the biasing spring 59 is in the following relation:

$$c < d,$$

where d is the fit length between the lead screw 51 and the fore end bearing 61 (see FIG. 6 of the accompanying drawings).

However, in such a construction, the fore end bearing does not come off, but yet the flexure of the biasing spring 59 is mechanically regulated by the stator case 55b and therefore, the rear end portion of the output shaft 51 (the sliding portion thereof with respect to the biasing spring) strikes against the biasing spring 59 to thereby impart an injury, a trace of hit or the like to the end portion of the output shaft 51, and this has led to the possibility of hindering the operation of the motor.

Further, in the prior-art stepping motor, when the support member 56 for supporting the bearings 61 and 62 is to be mounted on the stator cases 55a and 55b, it is incorporated with the threaded portion of the output shaft 51 passed through the bearing 62 and therefore, the threaded portion or the like of the output shaft 51 is injured, and this has led to the possibility of causing deterioration in the operation of the motor.

Furthermore, recently, the working of the lead screw is often affected by the form rolling method which facilitates mass productivity, but in a bar material whose outer diameter is formed in advance to match the diameter of the bearing, the screw diameter becomes larger than the outer diameter after the form rolling, and post-working, for example, and therefore, centerless polishing or the like becomes necessary for making the screw diameter small, thereby leading to greatly increased costs.

SUMMARY OF THE INVENTION

It is an object of the present invention to solve the above-noted problems peculiar to the prior art and to make a plurality of stators which are provided around a rotor magnet fixable by resiliently deformable means provided in stator containing means.

It is another object of the present invention to regulate the axial movement of an output shaft to a predetermined amount or less by the use of at least one of bearings for supporting the output shaft.

Other objects of the present invention will become apparent from the following detailed description of a specific embodiment of the present invention.

3

DESCRIPTION OF THE PREFERRED EMBODIMENT

An embodiment of the present invention will hereinafter be described with reference to the drawings.

Figure 1:
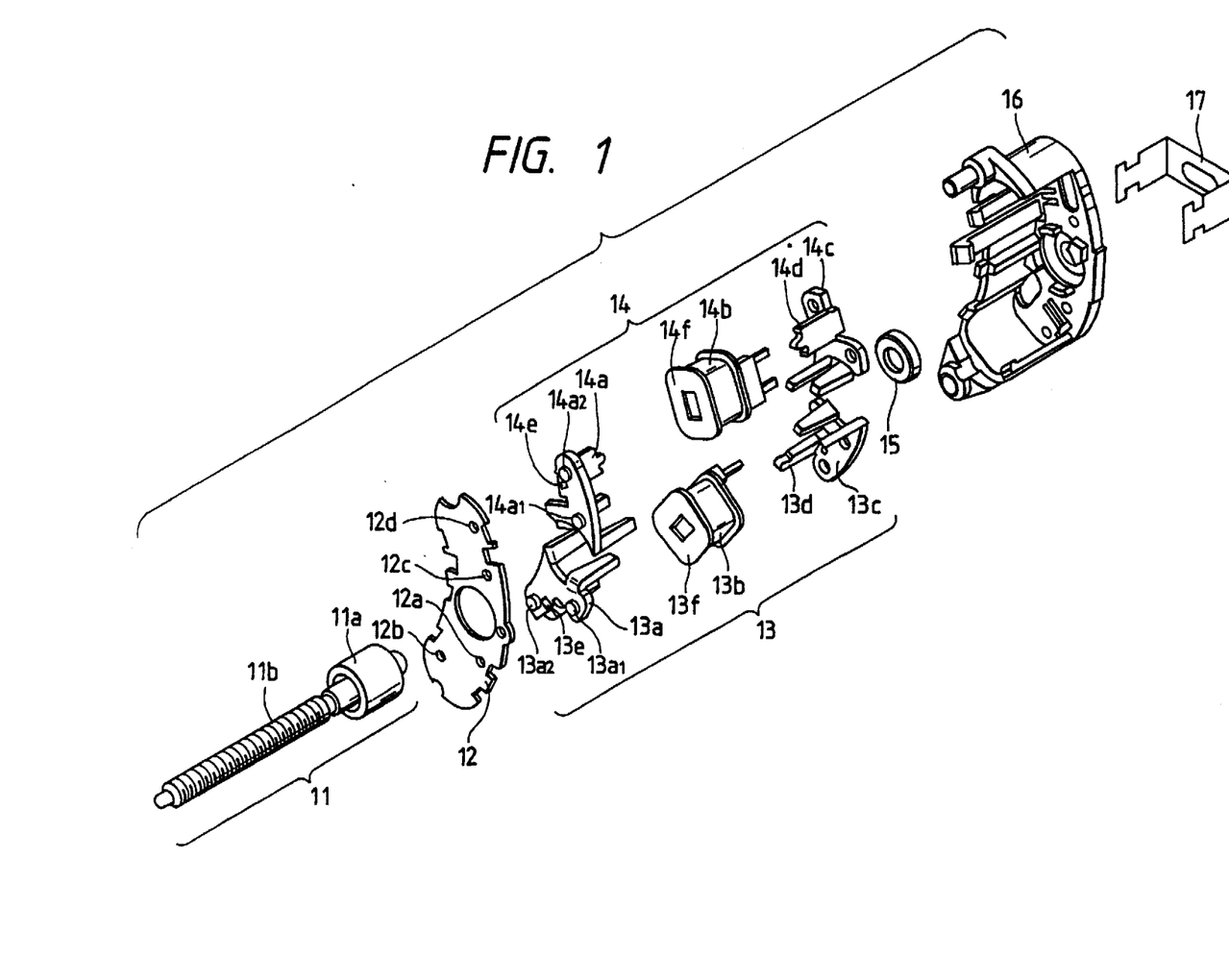
FIG. 1 is an exploded perspective view of a stepping motor according to an embodiment of the present invention.

FIG. 1 is an exploded perspective view of a stepping motor according to the present invention. In FIG. 1, the reference character 11a designates a multipole-magnetized rotor magnet, and the reference character 11b denotes a lead screw. The rotor magnet 11a and the lead screw 11b are fixed to each other in a predetermined positional relation as by an adhesive agent and made integral with each other, and constitute an output shaft 11.

The reference numerals 13 and 14 generally designate upper stators 13a, 14a, coils 13b, 14b and lower stators 13c, 14c respectively constituting a phase. The coils 13b and the 14b are wound on bobbins 13f and 14f, respectively.

The reference numeral 15 denotes the bearing of the output shaft 11. This bearing 15 is fixedly supported in a stator case 16. The bearing at the fore end of the output shaft 11 is not shown.

The reference numeral 12 designates the lid of a motor body. This lid 12 is attached to the stator case 16. The reference numeral 17 denotes a thrust spring having a biasing force in the axial direction of the output shaft 11. This thrust spring 17 normally biases the output shaft 11. The stator case 16 is shown with its side cut away to make the shape of its bottom clear.

Figure 2A:
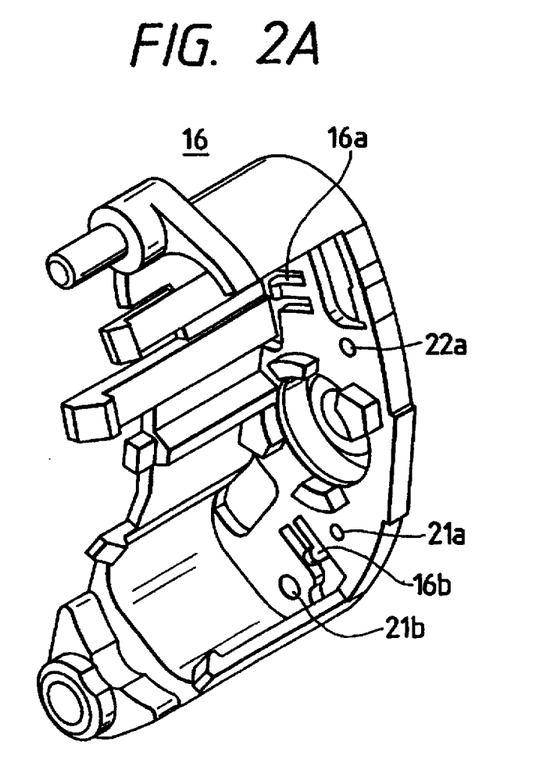
FIG. 2A is an enlarged perspective view of the stator case of the stepping motor shown in FIG. 1.
Figure 3:
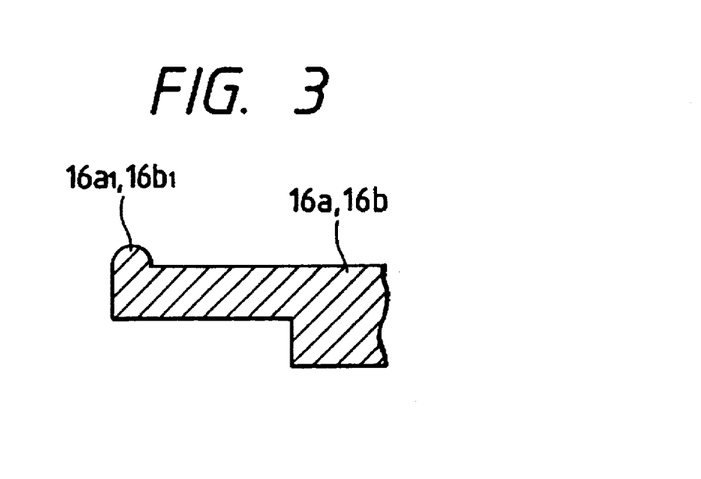
FIG. 3 is an enlarged view of the resiliently deformable portion of the stator case shown in FIG. 2A.

FIG. 2A shows an enlarged view of the stator case 16 of the stepping motor. In FIG. 2A, the reference characters 16a and 16b denote resiliently deformable portions provided at the bottom of the stator case 16. These resiliently deformable portions 16a and 16b have projected portions $16a_1$ and $16b_1$, respectively, as shown in FIG. 3. The projected portions $16a_1$ and $16b_1$ are provided near the portions on which the lower stators 13c and 14c are mounted.

As can be seen from FIG. 1, when the lower stators 13c and 14c are inserted into predetermined positions in the stator case 16, the lower stators 13c and 14c bear against the projected portions $16a_1$ and $16b_1$, respectively, of the resiliently deformable portions 16a and 16b. When the lower stators are further inserted and positioning pins (not shown) provided on the lower stator 13c are fitted into positioning apertures 21a and 21b formed in the stator case 16 to thereby cause the bottom surface of the lower stator 13c to bear against the bottom surface of the stator case 16 (and when the positioning pin of the lower stator 14c is likewise fitted into a positioning aperture 22a in the stator case 16 to

4 thereby cause the bottom surface of the lower stator 14c to bear against the bottom surface of the stator case 16), the resiliently deformable portions 16a and 16b have their projected portions $16a_1$ and $16b_1$ pushed outwardly and flex by an amount corresponding to the height of the projected portions, and as a result, they bias the lower stators toward the output shaft with a predetermined biasing force. Therefore, a biasing force is directly imparted to the lower stators. The lower stators 13c, 14c and the upper stators 13a, are made integral with each other by the fitting of their projected portions 13d, 14d into the apertures 13e, 14e through the bobbins 13f, 14f and therefore, the biasing force imparted to the lower stators 13c and 14c is transmitted to the upper stators 13a and 14a, which are thus biased toward the lid 12. The pins $13a_1$, $13a_2$ and $14a_1$, $14a_2$ of the upper stators 13a and 14a are fitted in positioning apertures 12a, 12b, 12c and 12d in the lid 12, and the lid 12 is restrained by the restraining piece 16c of the stator case 16.

Figure 2B:
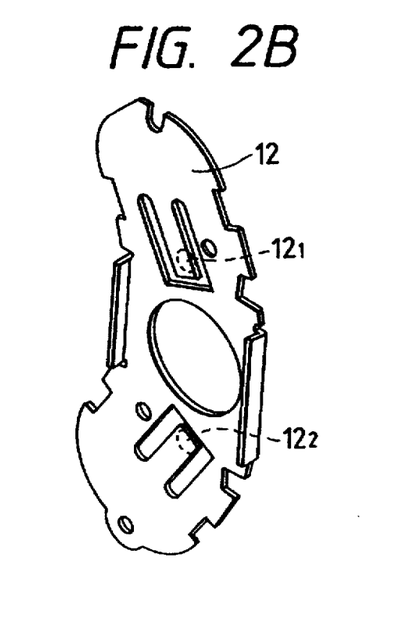
FIG. 2B shows the lid of the stator case shown in FIG. 1 when it is provided with a resiliently deformable portion.

As described above, the resiliently deformable portions for biasing the stators are integrally formed in the stator case 16, whereby the stators are fixed in the stator case 16 and thus, there is provided a motor which has stable characteristics and quality, and is moreover inexpensive. In this embodiment, the resiliently deformable portions are provided in the stator case 16, but alternatively, resiliently deformable portions $12_1$ and $12_2$ may be provided in the lid 12, as shown in FIG. 2B.

Figure 4A:
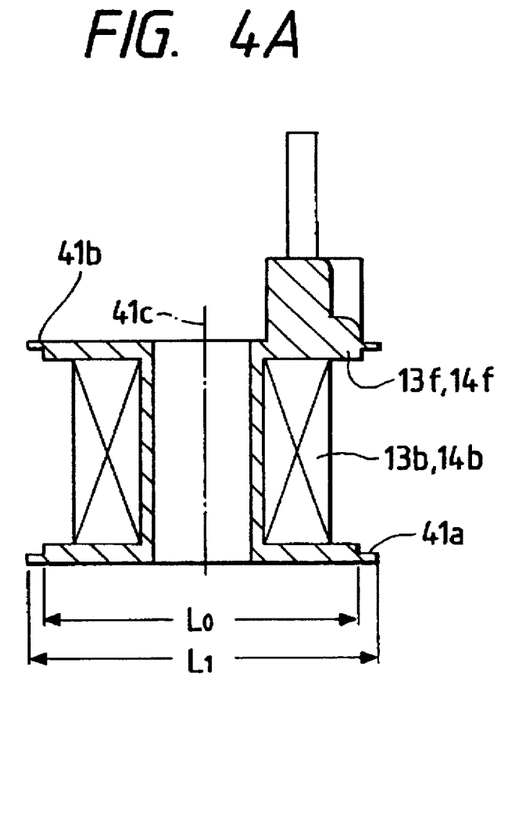
FIG. 4A is a cross-sectional view of the bobbin of the stepping motor shown in FIG. 1.

While in the above-described embodiment, the resiliently deformable portions are provided in the stator case 16 or the lid 12, the resiliently deformable portions may be provided in the bobbins 13f and 14f, as shown in FIG. 4A.

In FIG. 4A, the bobbins 13f and 14f are formed thinly with a predetermined width from the outermost peripheral portions of flanges at the opposite end toward a coil shaft 41c. The width (radial) of these thin portions (resiliently deformable portions) 41a and 41b is set so as to satisfy the following condition:

$$L_1 > L > L_0,$$

where $L_1$ is the width of the outermost peripheral portions of the flanges at the opposite ends of the bobbins 13f, 14f, L is the width of the inner wall of the stator case, and $L_0$ is the width of the thick portions of the flanges at the opposite ends of the bobbin 13f, 14f.

A description will now be provided of the procedure of assembling the thus constructed stepping motor. The bearing 15 and thrust spring 17 are first fixed to the stator case 16. The upper stator 13a or 14a and the lower stator 13c or 14c are then combined together with the coil 13b or 14b interposed therebetween, thereby making a stator unit comprising the upper and lower stators and the coil. This stator unit is then put into the stator case in such a manner that the positioning pins on the stators fit into the positioning apertures in the stator case.

Figure 4B:
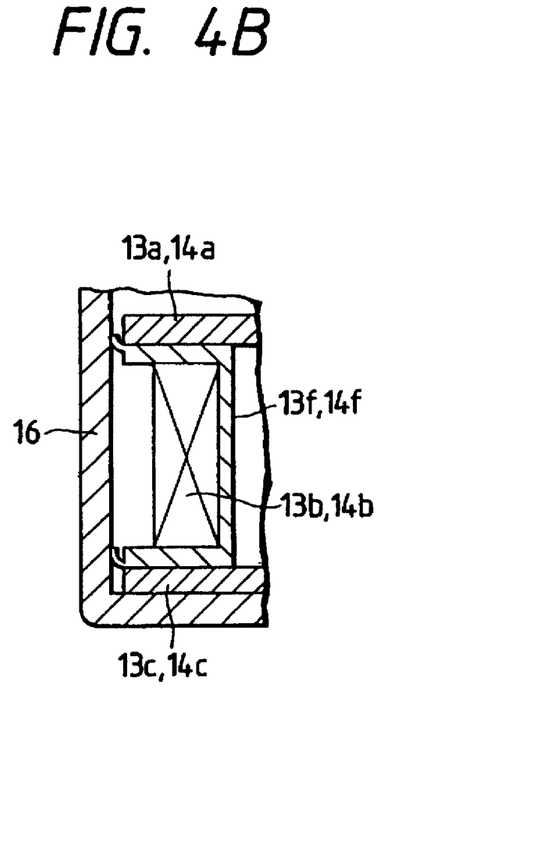
FIG. 4B is a cross-sectional view showing the bobbin of FIG. 4A as it is incorporated into the stator case.

As previously described, the outermost peripheral portion of the bobbins 13f, 14f is larger in dimension than the width of the inner wall of the stator case, but this outermost peripheral portion is thin and therefore, is deformed as shown in FIG. 4B when the stator unit is put into the stator case. As a result, the stator unit is fixed in the stator case without back-lash.

As described above, according to the present invention, instead of the stator case and stators being made integral with one another by spot welding or the like as in the prior art, resiliently deformable portions are provided in portions of the stator case or the coil bobbin, whereby the stators can be fixed in the stator case and thus, there can be provided a stepping motor which is inexpensive as compared with the prior-art stepping motor, and the stabilization of the characteristics thereof can be accomplished.

Figure 5:
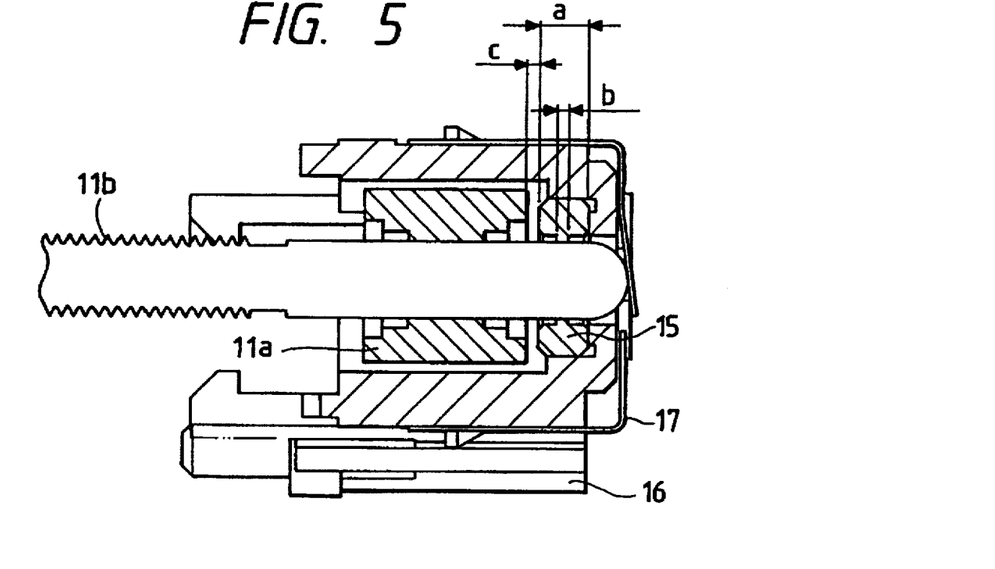
FIG. 5 is a cross-sectional view showing the rear side bearing of the stepping motor shown in FIG. 1 and the parts associated therewith.

FIG. 5 shows the rear side bearing portion of the stepping motor shown in FIG. 1, and more particularly shows the assembled state of the bearing 15, the stator case 16 and the output shaft 11, and the bearing 15 is forced into and fixed in the stator case 16. As can be seen from FIG. 5, the rotor 11a and the rear end bearing 15 are disposed with a clearance c provided therebetween. This clearance c is shorter than the fit length d of the output shaft and the fore end bearing shown in FIG. 6, and is shorter than the maximum flexure length Smax of the biasing spring 17 (the maximum flexure amount for which the biasing spring 17 does not fall flat). That is, the clearance c is set by the following conditions:

$$c < d \text{ and } c < Smax$$

That is, c is set to a value smaller than smaller one of d and Smax. Although in the present embodiment, the fore end bearing is not shown, it may be provided in an apparatus on which the motor is mounted, or a metal sheet member having the fore end bearing alone attached thereto as in the prior art may be provided.

Figure 7:
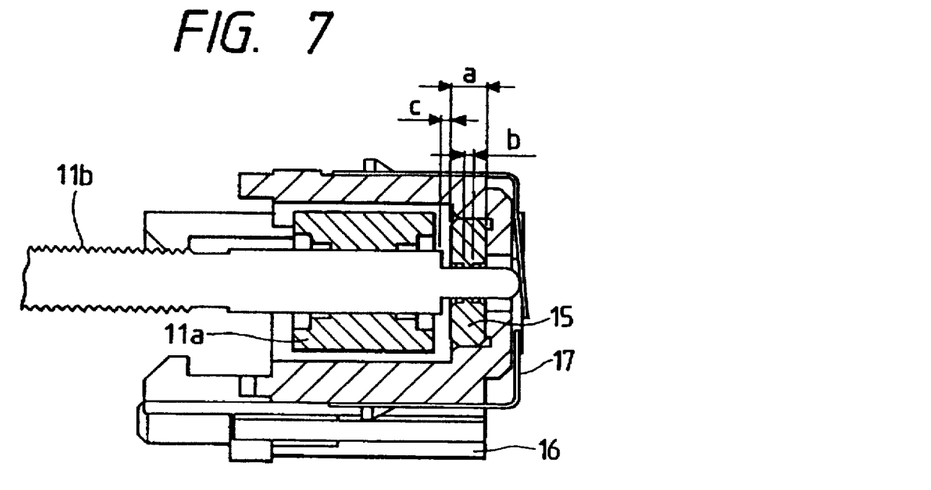
FIG. 7 is a cross-sectional view showing another example of the rear side bearing of the stepping motor shown in FIG. 5 and the parts associated therewith.

FIG. 7 shows another example of the rear side bearing portion shown in FIG. 5. In FIG. 7, a stepped portion is provided on the output shaft 11 and the clearance c between the end surface thereof and the rear side bearing 15 is set so as to satisfy the conditions described in connection with FIG. 5.

As described above, according to the present invention, bearings are disposed on the opposite end portions of the output shaft, at least one of the bearings is incorporated into the stator case having the stators and coils incorporated therein, from one direction (the output shaft side), the clearance between that end surface of the bearing which is adjacent to the cylindrical type magnet and the cylindrical type magnet or the stepped portion of the output shaft is set to a predetermined value, and when a force (impact force) toward the output shaft acts on the motor, the movement of the output shaft is kept in an amount corresponding to the clearance, whereby the output shaft can be prevented from coming off the fore end bearing portion, or the biasing spring can be prevented from being flexed as much as it falls flat, or an injury, a trace of hit or the like can be prevented from being imparted to the sliding portion of the output shaft and the biasing spring.

Also, grease or the like to be applied to the sliding portion of the bearing and the output shaft is applied from the open side of the stator case and therefore, the oozing of the grease and the adherence of dust to the grease can be prevented.

Figure 8:
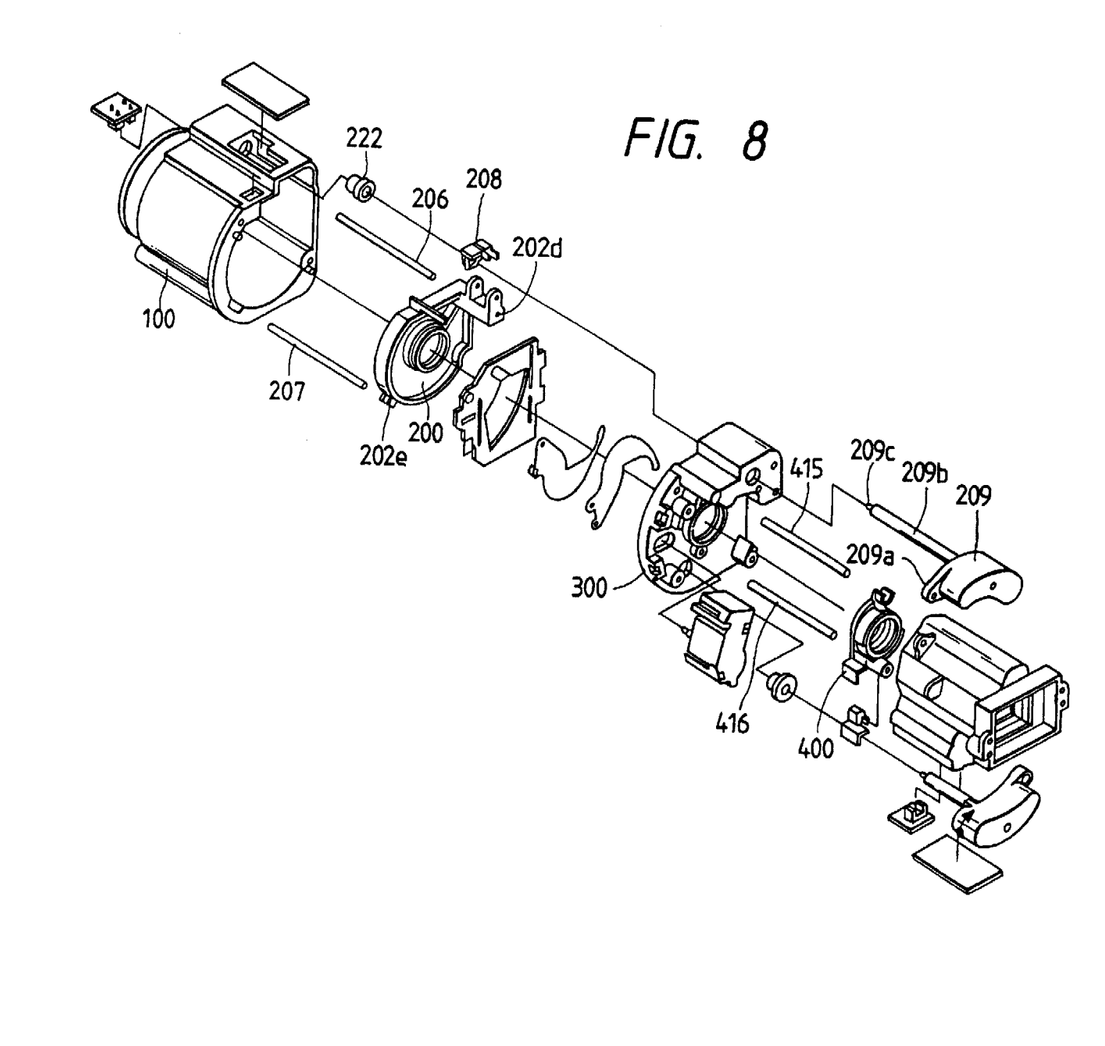
FIG. 8 is an exploded perspective view of the stepping motor of FIG. 1 as it is incorporated into a lens barrel.

A description will now be provided of a case where the stepping motor of FIG. 1 is used as a lens driving device. FIG. 8 is an exploded perspective view showing a case where the stepping motor of FIG. 1 is used in the phototaking lens of a video camera. In FIG. 8, the reference numeral 200 designates a V holding frame for holding a variator lens group for changing the angle of field, and the reference numeral 400 denotes an RR holding frame for holding an RR lens group having both of the function of changing the focal position with a change in the angle of field and the focusing function. The V holding frame 200 is movable in the direction of the optical axis by two guide bars 206 and 207, and the RR holding frame 400 is movable in the direction of the optical axis by two guide bars 415 and 416. Describing the V holding frame 200 in detail, the guide bars 206 and 207 are provided in parallel to the optical axes of the aforementioned variator lens group and RR lens group, and one end of each of them is fixed to a lens barrel 100 and the other end of each of them is fixed to a lens barrel 300. Further, the guide bar 206 is fitted to the sleeve 202d of the V holding frame 200, the guide bar 207 is fitted in the U-shaped groove 202e of the V holding frame 200, and the V holding frame 200 is movable in the direction of the optical axis by the guide bars 206 and 207, as previously described.

The reference numeral 209 designates the stepping motor of FIG. 1, and the operatively associated portion thereof with the V holding frame 200 will now be described. The output shaft 209b of the stepping motor is first inserted into the motor body through an aperture larger than the outer diameter of a rotor core provided in a stator keeper (lid) (not shown). The output shaft 209b is then held in a rack 208, whereafter it is incorporated so that the tip end portion of the output shaft may be supported by a bearing 222. The output shaft 209b is formed with a thread of a predetermined lead, and this thread meshes with the rack 208 mounted on the V holding frame 200 and therefore, the V holding frame 200 is moved in the direction of the optical axis with the rotation of the output shaft 209b. At this time, the tip end portion 209c of the output shaft 209b is supported by the bearing 222 fixed to the lens barrel 100. The motor body 209a is fixed to the lens barrel 300 by screws or the like. The RR holding frame 400 is similar in structure to the V holding frame 200 and therefore need not be described. Further, in this example, a resiliently deformable portion for biasing the stator core is provided in the stator case, but alternatively, it may be provided in the stator keeper.

As described above, according to the present invention, the bearing for supporting the distal end portion of the shaft is fixed to the bottom surface portion of the motor body and an aperture larger than the outer diameter of the rotor core is formed in the lid of the body, and the rotor (the rotor core and the shaft with a lead screw) is inserted through that aperture so as to support the shaft and therefore, it becomes unnecessary to incorporate the motor with the threaded portion of the shaft passed through the bearing as in the prior-art motor, and it will never happen that the threaded portion is injured to thereby lower the performance of the motor.

Also, when the lead screw is to be worked, a shaft diameter matching the bearing can be made by form rolling, and the finishing work after that can be accomplished simply by polishing the whole shaft uniformly, and this leads to the possibility of reducing the cost of the shaft.

Further, in the case of the stepping motor of the present invention, the rotor unit can be easily removed and therefore, simply by the length of the rotor being variously changed, there are provided many kinds of stepping motors which are excellent in versatility.

What is claimed is:

1. A stepping motor including:

a multipole-magnetized rotor magnet;

an output shaft coupled to said rotor magnet;

a stator disposed around said rotor magnet, said stator being comprised of one stator piece and another stator piece;

a coil for exciting said stator;

a bobbin having said coil wound thereon;

containing means for containing said stator, said coil and said bobbin; and biasing means for biasing said stator toward said containing means, said biasing means having a resiliently deformable portion and biasing said stator toward said containing means by the resilient deforming force of said resiliently deformable portion to thereby fix said stator to said containing means, wherein said containing means has a case and a lid, wherein one of said case and said lid has said resiliently deformable portion, and wherein said stator is biased toward said containing means by the resilient deforming force of said resiliently deformable portion.

2. A stepping motor according to claim 1, wherein said resiliently deformable portion has a projected portion, and said one or another stator piece bears against said projected portion to thereby create a resilient deforming force in said projected portion and bias said stator toward said containing means.

3. A stepping motor including:

a multipole-magnetized rotor magnet;

an output shaft coupled to said rotor magnet;

a stator disposed around said rotor magnet, said stator being comprised of one stator piece and another stator piece;

a coil for exciting said stator;

a bobbin having said coil wound thereon;

containing means for containing said stator, said coil and said bobbin; and biasing means for biasing said stator toward said containing means, said biasing means having a resiliently deformable portion and biasing said stator toward said containing means by the resilient deforming force of said resiliently deformable portion to thereby fix said stator to said containing means, wherein said resiliently deformable portion is a thin portion formed in the outermost peripheral portion of a flange of said bobbin.

4. A stepping motor according to claim 3, wherein said containing means has a case, and the width of the thin portion of said bobbin satisfies the condition that $L_1 > L > L_0$, where $L_1$ is the width of the outermost peripheral portion of the flange of said bobbin, L is the width of the inner wall of said case, and $L_0$ is the width of the thick portion of the flange of said bobbin.

5. A stepping motor including:

a multipole-magnetized rotor magnet;

an output shaft coupled to said rotor magnet;

a stator disposed around said rotor magnet, said stator being comprised of one stator piece and another stator piece;

a coil for exciting said stator;

a bobbin having said coil wound thereon;

biasing means for biasing said output shaft;

a first bearing for supporting said output shaft in the axial direction and diametrical direction thereof; and a second bearing provided on the side opposite to said first bearing and supporting said output shaft in the diametrical direction thereof, the clearance c between said second bearing and said rotor magnet being set so as to satisfy the conditions that $c < d$ and $c < Smax$, where d is the fit length of said output shaft and said first bearing and Smax is the maximum amount of flexure of said biasing means within the allowable stress thereof.

6. A stepping motor according to claim 5, further including a containing case for containing said rotor magnet, said stator, said coil and said bobbin and wherein said second bearing is inserted into said case from said rotor magnet side and fixed therein.

7. A stepping motor including:

a multipole-magnetized rotor magnet;

an output shaft coupled to said rotor magnet, said output shaft having a stepped portion;

a stator disposed around said rotor magnet, said stator being comprised of one stator piece and another stator piece;

a coil for exciting said stator;

biasing means for biasing said output shaft;

a first bearing for supporting said output shaft in the axial direction and diametrical direction thereof; and a second bearing provided on the stepped portion side opposite to said first bearing and supporting said output shaft in the diametrical direction thereof;

the clearance c between said second bearing and the stepped portion of said output shaft being set so as to satisfy the conditions that $c < d$ and $c < Smax$, where d is the fit length of said output shaft and said first bearing, and Smax is the maximum amount of flexure of said biasing means within the allowable stress thereof.

8. A stepping motor according to claim 7, further including a containing case for containing said rotor magnet, said stator, said coil and said bobbin and wherein said second bearing is inserted into said case from said rotor magnet side and fixed therein.

9. A stepping motor for driving a lens including:

a multipole-magnetized rotor magnet;

an output shaft coupled to said rotor magnet;

a stator disposed around said rotor magnet, said stator being comprised of one stator piece and another stator piece;

a coil for exciting said stator;

a bobbin having said coil wound thereon;

biasing means for biasing said output shaft;

a first bearing for supporting one end side of said output shaft;

containing means for containing said rotor magnet, said output shaft, said stator, said coil, said bobbin, and said biasing means, said containing means having a mounting portion with respect to a lens barrel body; and a second bearing provided on the side opposite to said first bearing and supporting the other end side of said output shaft, said second bearing being provided in the lens barrel body.

10. A stepping motor according to claim 9, wherein said containing means has a case and a lid, wherein one of said case and said lid has a resiliently deformable portion, and wherein said stator is biased toward said containing means by the resilient deforming force of said resiliently deformable portion.

11. A stepping motor including:
   a rotor magnet;
   an output shaft coupled with a lead screw for supporting said rotor magnet;
   a stator disposed around said rotor magnet, said stator being comprised of one stator piece and another stator piece;
   a coil for exciting said stator;
   a bobbin having said coil wound thereon;
   biasing means for biasing said output shaft;
   a first bearing for supporting one end side of said output shaft;
   a second bearing provided on the side opposite to said first bearing and supporting the other end side of said output shaft; and
   containing means for containing at least said rotor magnet, said stator, said coil, said bobbin and second bearing, wherein
   said containing means forms a container space by a first body and a second body combined with said first body,
   said second body is provided with a through hole leading to said container space, the through hole having a greater diameter than the outer diameter of said rotor magnet,
   said second bearing is disposed on said first body at a place in said container space opposite to the through hole of said second body, and
   said other end side of said output shaft is inserted into the through hole and supported by said second bearing.

12. A stepping motor according to claim 11, wherein said first body of said containing means is a case and said second body is a lid.

* * * * *

UNITED STATES PATENT AND TRADEMARK OFFICE
CERTIFICATE OF CORRECTION

PATENT NO. : 5,705,864

DATED : January 6, 1998

INVENTOR(S) : HIRONORI TAKANO ET AL.

It is certified that error appears in the above-identified patent and that said Letters Patent is hereby corrected as shown below:

COLUMN 3

Line 30, "made" should read --are made--.

COLUMN 4

Line 9, "upper stators 13a," should read
      --upper stators 13a, 14a--.
    Line 46, "bobbin 13f, 14f," should read
      --bobbins 13f, 14f,--.

COLUMN 8

Line 8, "c Smax," should read --c < Smax,--.

Signed and Sealed this

Twenty-first Day of July, 1998

Attest:

BRUCE LEHMAN

*Attesting Officer*      *Commissioner of Patents and Trademarks*